Feb. 2, 1960  F. DE SENIGON DE ROUMEFORT  2,923,421
IMPROVEMENTS IN MECHANIZED GARAGES
Filed April 13, 1956  7 Sheets-Sheet 3

INVENTOR.
FRANCOIS DE SENIGON
DE ROUMEFORT
BY

ATTORNEY.

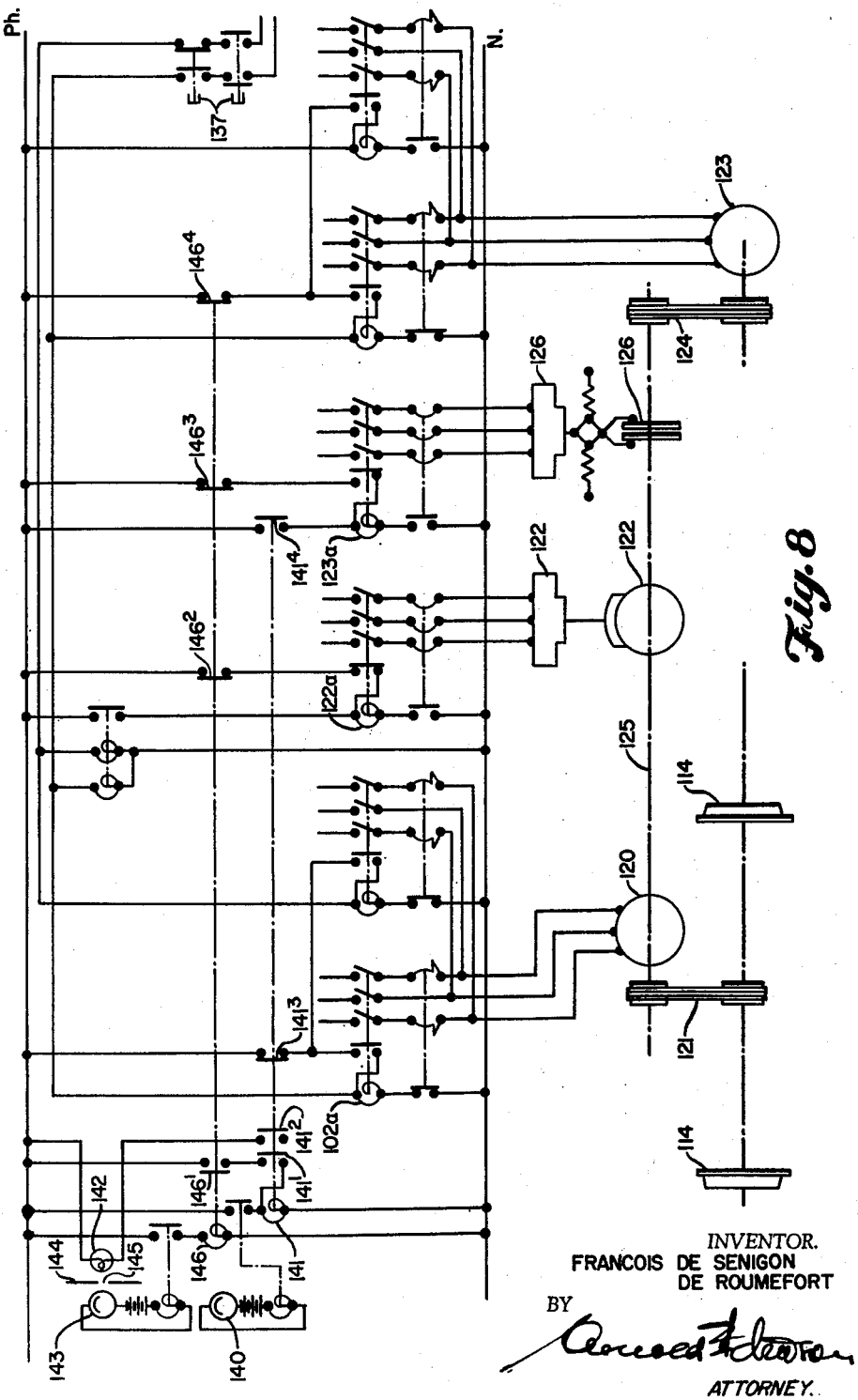

Feb. 2, 1960   F. DE SENIGON DE ROUMEFORT   2,923,421
IMPROVEMENTS IN MECHANIZED GARAGES
Filed April 13, 1956                      7 Sheets-Sheet 5

INVENTOR.
FRANCOIS DE SENIGON
DE ROUMEFORT
BY
ATTORNEY.

Feb. 2, 1960  F. DE SENIGON DE ROUMEFORT  2,923,421
IMPROVEMENTS IN MECHANIZED GARAGES
Filed April 13, 1956  7 Sheets-Sheet 6

INVENTOR.
FRANCOIS DE SENIGON
DE ROUMEFORT
BY
ATTORNEY.

Feb. 2, 1960   F. DE SENIGON DE ROUMEFORT   2,923,421
IMPROVEMENTS IN MECHANIZED GARAGES
Filed April 13, 1956   7 Sheets-Sheet 7

INVENTOR.
FRANCOIS DE SENIGON
DE ROUMEFORT
BY
ATTORNEY.

United States Patent Office 2,923,421
Patented Feb. 2, 1960

2,923,421

IMPROVEMENTS IN MECHANIZED GARAGES

François de Senigon de Roumefort, Paris, France

Application April 13, 1956, Serial No. 577,993

Claims priority, application France April 13, 1955

2 Claims. (Cl. 214—16.1)

The present invention relates to mechanised garages of the kind in which the vehicles are shifted by apparatus which carries them to and from the point where they are to be stored.

Garages of the described character may be arranged vertically above the ground or below road level.

In both cases they permit space to be economically utilized and space is becoming more and more scarce in built-up areas. However, the known garages of the described character have the serious disadvantage of requiring a considerable time for stowing the vehicles in the housing spaces, which may be a vehicle lift or a conveyor carriage, when a large number of vehicles arrive at the same moment. The same applies when a large number of vehicles are to be taken away in a short time.

It is an object of the present invention to provide a mechanised garage which satisfies the basic requirements for the vehicle stowing and delivering operations which are to make them automatic, thereby reducing human intervention to the minimum, and to increase the speed which is a basic condition for effective parking, namely for a garage where vehicles are left for a relatively short time, but where the flow of vehicles may be heavy at any particular moment. A further object is to provide a mechanised garage wherein the motorist has nothing to do other than placing his vehicle at a given point, braking it if necessary and taking his ticket, but has no other operations to perform.

In accordance with an aspect of the invention the vehicles are brought to the various parts of the garage where they are to be stored by a carriage embodying a platform mounted on wheels and which is moved between two rows of vehicle cages and comprises a device intended to place the vehicles in the cages, such device including a network of rods placed perpendicularly to a central frame and adapted to be moved vertically to be displaced to one side or the other of the platform.

The vertical movements and the translation movements of the device always follow one another in accordance with a predetermined plan and for this reason they may be controlled automatically.

The vertical movements of the system may be effected by a parallellogram link system.

The horizontal displacements of the vehicle transfer system may be effected by a motor driving wheels which support the platform.

The supply of current to the electric motor on the platform may be effected by means of pick-up wires.

The various operations are remotely supervised by means of a luminous electric signalling system. Operational safety is ensured by one or more audible alarm signals operated by means of an electric or mechanical supervisory circuit.

The above, and other objects, features and advantages of the invention, will be apparent in the following detailed description of an illustrative embodiment thereof which is to be read in connection with the accompanying drawings forming a part hereof, and wherein:

Fig. 8 is a wiring diagram of the electrical controls for the carriage movement between rows of vehicle receiving cages;

Figure 1:
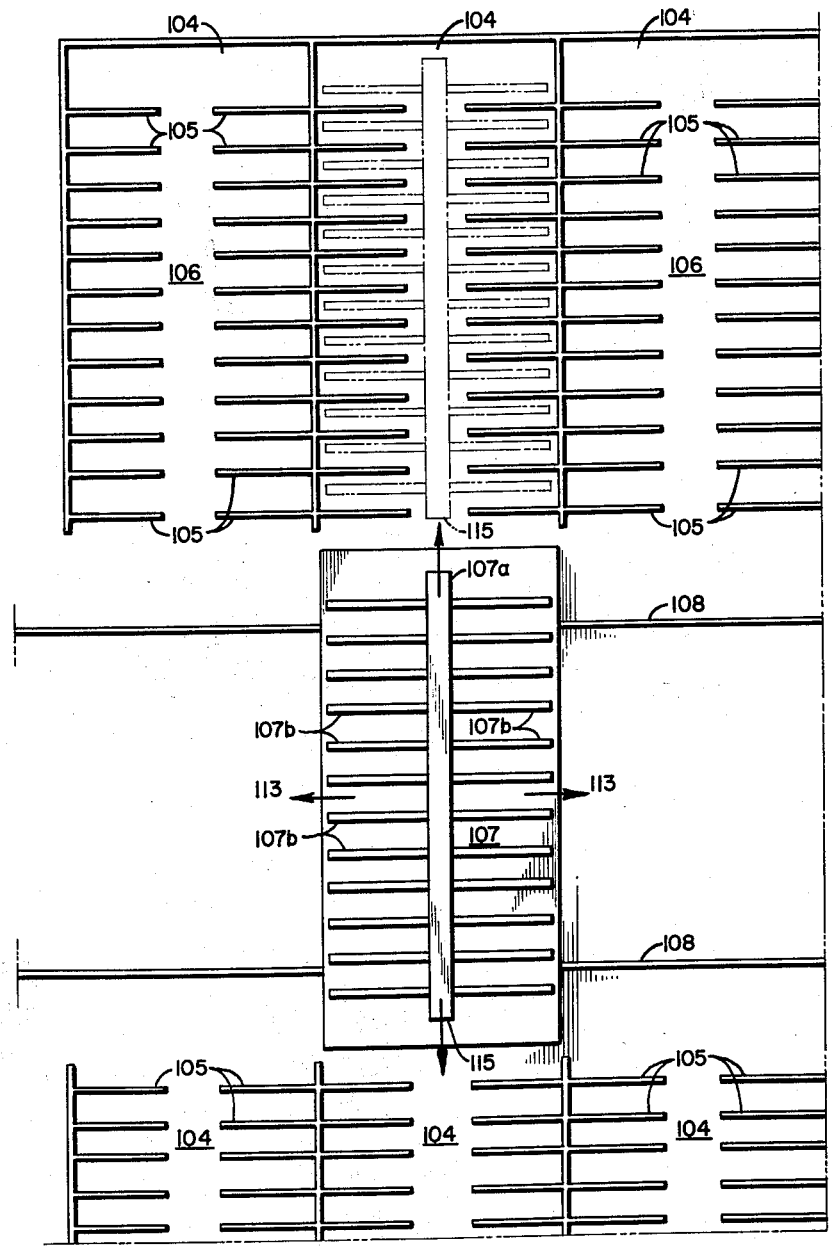
Fig. 1 is a diagrammatic plan view of a portion of an automatic garage embodying the invention.

Referring to Fig. 1 it will be seen that the vehicles to be stored are supplied on a carriage 107 the wheels of which are moved on rails 108. This carriage may be actuated by devices hereinafter described to bring it opposite the cages 104 each intended to hold one vehicle. The cages 104 are provided with horizontally placed rods 105 extending laterally toward each other at a certain distance from the ground and with a central gap 106 remaining between the inner ends of the rods. The stored vehicle rests on these rods 105.

The upper part of the carriage 107 also embodies a network of horizontal rods 107b extending laterally from the opposite sides of a central member 107a which is dimensioned to pass vertically through the gap 106. The central member 107a and the rods 107b may be displaced together upwardly or downwardly. They may also be displaced in the direction of the arrows 115 and can occupy the position shown in chain dot lines in the upper part of Fig. 1.

The vehicle, placed on a carriage 107, is brought in front of the cage where it is to be stored. The central member 107a and rods 107b are lifted and brought into one of the cages, with the rods 107b passing above the elements 105 during such movement. On arrival within a cage 104 the central member 107a and rods 107b are lowered, with the rods 107b passing between the rods 105. The vehicle now rests in a cage with its wheels resting on the rods 105. The central member 107a and rods 107b are then brought back above the carriage 107 and may be employed for the handling of another vehicle.

It should be understood that the operations described are repeated in the opposite direction for delivery of the vehicle from storage.

It is to be noted that the various operations of lifting and lowering the carriage may be controlled automatically since they succeed one another in a predetermined and repeated sequence. When the assembly of central member 107a and rods 107b is in the lower positions, it is set for loading either with a vehicle from the entry grid when such vehicle is to be stowed, or with a vehicle already present in a cage which is to be removed therefrom for return to the driver.

This regular sequence permits automatic control of the movement. Since the vertical movement is only effected when the lateral displacement is completed a simple limit switch permits control of this operation.

The completion of the vertical movements causes the re-starting of the horizontal displacement of the assembly of the central member 107a and rods 107b to move it back onto the carriage 107 in a longitudinal direction.

The vertical movement of the system assembly 107a—107b may be effected either by mechanical jacks operated by one or more motors or by hydraulic jacks or by cams or by parallelogram link systems.

The operation of the vehicle shift carriage 107 involves the following series of steps:

(1) The assembly 107a, 107b being in the lower position, is displaced transversely to position it below a grid supporting the vehicle.

(2) The assembly 107a, 107b is moved from the lower position to the upper position.

(3) Having assumed support of the vehicle the assembly 107a, 107b is returned to its position above the carriage.

(4) The carriage 107 is brought in front of a selected cage 104.

(5) The assembly 107a, 107b, while in the upper position is moved into the cage.

(6) After its movement into the cage the assembly 107a, 107b is lowered and the vehicle then rests on the grid 105 in the cage.

(7) The lowered assembly 107a, 107b is returned to the position above the carriage and the device is ready for the next operation.

The control of the carriage 107 presents numerous problems for the design of automatic equipment and to meet these problems certain simple and reliable operating devices are now described.

Figure 2:
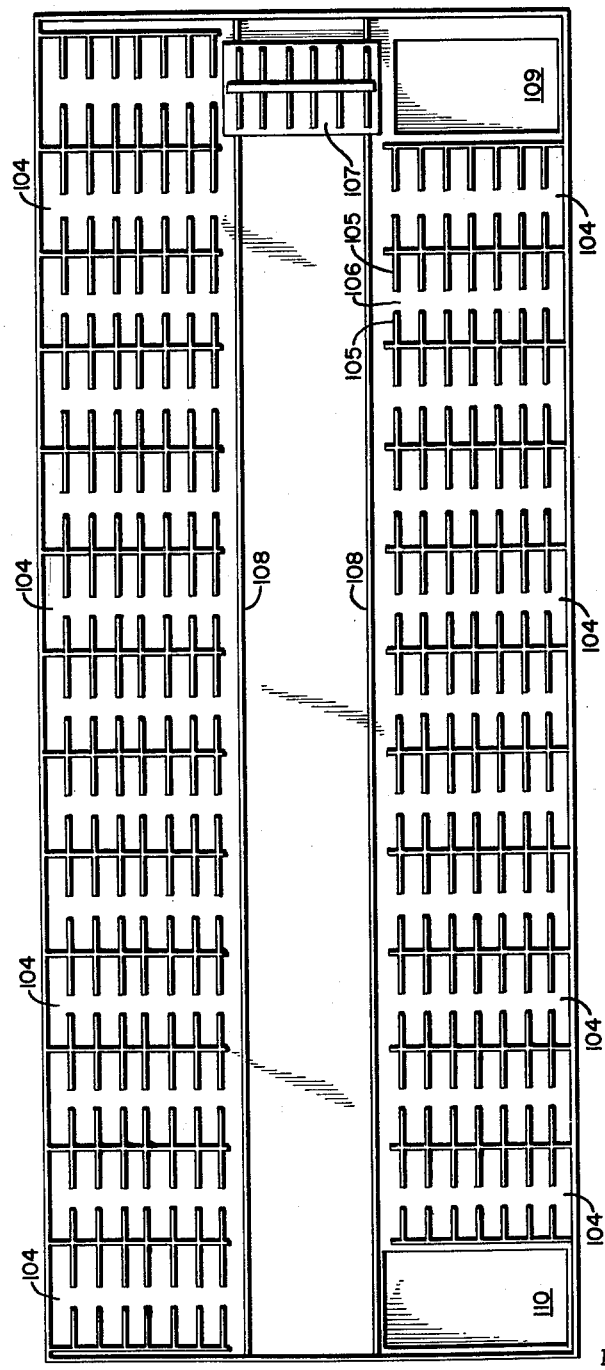
Fig. 2 is a diagramamtic plan view of an entire floor or level of the automatic garage, shown in a reduced scale.

Referring to Fig. 2 it will be seen that a mechanical garage embodying the invention may have two rows of cages 104 arranged at opposite sides of a central aisle along which the rails 108 extend between the two rows of cages.

Vehicle lifts or elevators 109, 110 are disposed at opposite ends of the rows of cages 104 to permit access to each of the several levels of the garage, and such elevators can be used alternately for lifting and lowering of the vehicles.

Figure 3:
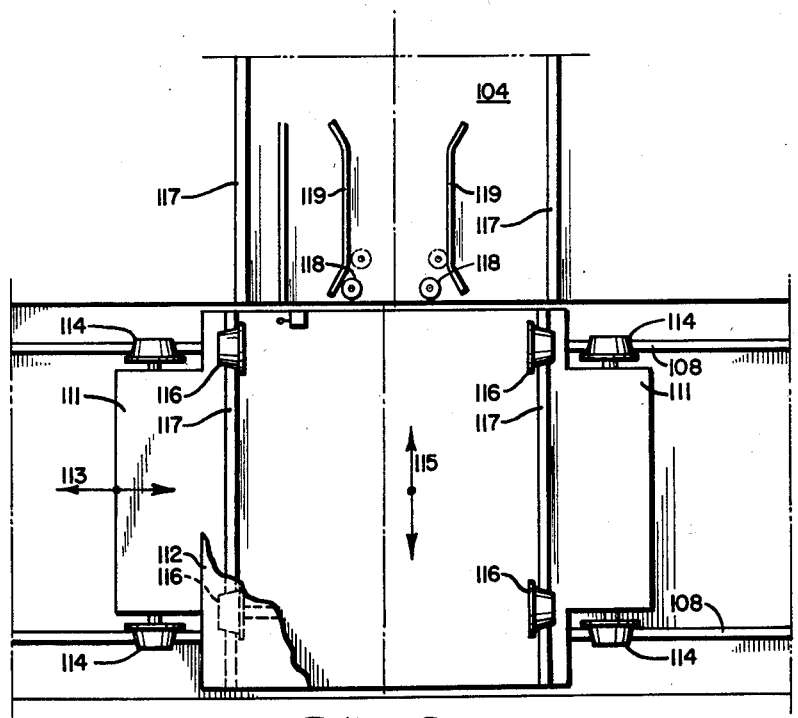
Fig. 3 is a diagrammatic plan view of a carriage included in the automatic garage of Figs. 1 and 2 and used for transporting vehicles.

Referring to Fig. 3 it will be seen that the vehicle support carriage 107 has two platforms, 111 and 112, arranged one above the other. The lower platform 111 can be moved in the directions represented by the arrows 113 by reason of wheels 114 bearing on rails 108. The platform 112 may move in the direction represented by the arrows 115 by means of wheels 116 riding on rails 117 arranged partly on the platform 111 and partly on the floor of each cage 104.

An arrangement comprising rollers 118 mounted on the platform 112 and guides 119 rigid with the floor of the cage 104 provides automatic alignment of the rail sections 117 on platform 111 and on the floor of cage 104 in response to displacement of platform 112 in the direction of one of the arrows 115. During the displacement of the platform in the direction of the arrows 115 one or the other of the rollers 118 comes into contact with the widened part of a related one of the guides 119; and the continued movement of the platform 112 then produces displacement of the platform 111 along rails 108 in the event of misalignment and this displacement continues until correct alignment of the rail sections 117 is obtained. Such displacement of platform 111 occurs just before the wheels 116 come into contact with the rail sections 117 located on the floor of the cage.

Figure 4:
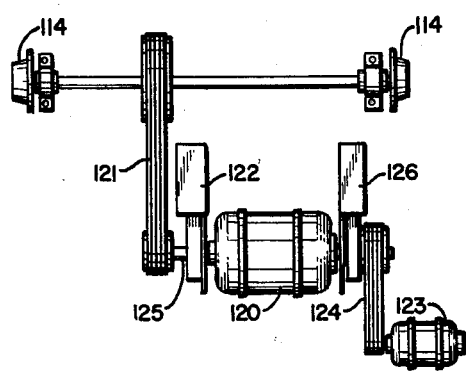
Fig. 4 is a detail plan view of a drive mechanism for the carriage of Fig. 3.

Displacement of the platform 111 on the rails 108 is effected by the drive mechanism shown in Fig. 4, which is arranged on the platform 111 and which is energized electrically with current supplied by trolley wires arranged along the travelling track 108 or by any other device such as a wind-on cable. This drive mechanism comprises a main motor 120 operating the wheels 114 through a transmission device 121. An electric braking device 122 is engageable with a brake drum which is arranged on the motor shaft 125. A second or auxiliary motor 123 is provided for driving the wheels 114, and consequently the platform 111, at a speed which is substantially lower than that produced by motor 120, and the auxiliary motor 123 is coupled to a transmission unit 124 driving the shaft 125 of the motor 120 through an electric clutch 126. The electrical devices which are hereinafter described in detail ensure operation under correct conditions of the various elements comprising the drive mechanism for the platform 111.

Figure 5:
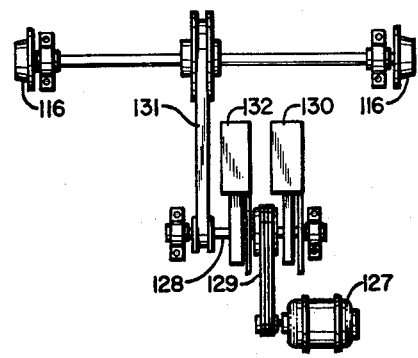
Fig. 5 is a detail plan view of another drive mechanism for the carriage of Fig. 3.

The displacement of the platform 112 along the rail sections 117 is effected by the drive mechanism which is mounted on platform 112 and shown in Fig. 5.

This drive mechanism comprises a motor 127 driving an intermediate shaft 128 by means of a transmission 129 and an electric clutch 130. The rotation of the intermediate shaft 128 is transmitted to the wheels 116 by a transmission system 131 and an electric brake 132 permits the whole assembly to be stopped by acting on a brake drum on the shaft 128.

The drive mechanism for the platform 112 is controlled by an electrical system which is hereinafter described in detail.

Figure 11:
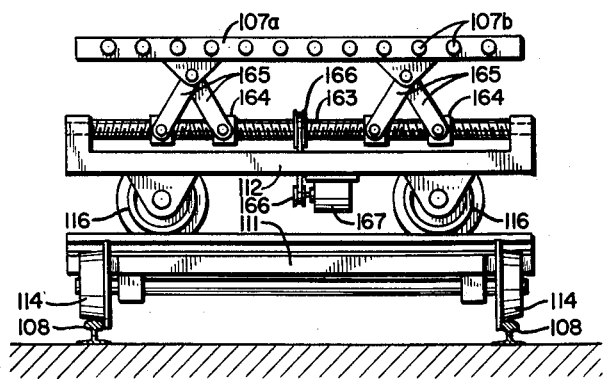
Fig. 11 is a side elevational view, partly in section, of the vehicle transporting carriage, and particularly showing the arrangement provided for effecting vertical movements therein.

Referring to Fig. 11, it will be seen that, in the carriage 107, the assembly of the central member 107a and rods 107b is mounted on the platform 112 for vertical movement with respect to the latter. In the illustrated embodiment of the invention, the mounting for the assembly 107a, 107b includes a screw member 163 which is rotatably carried by platform 112 and which has four threaded portions alternately provided with right and left-hand threads. Nuts 164 threadably engage the four threaded portions of screw member 163, and two pairs of links 165 are pivotally connected, at their upper ends, to brackets 168 on central member 107a and, at their lower ends, to the nuts 164. Thus, when screw member 163 is rotated in one direction, each pair of links 165 is spread open to lower the assembly 107a, 107b toward platform 112 and, when screw member 163 is rotated in the opposite direction, each pair of links 165 is moved together to raise the assembly 107a, 107b.

In order to effect the necessary rotation of screw member 163, an electric motor 167 is provided and is connected to member 163, for example, by a belt and pulley transmission 166.

From the above, it is apparent that the movement of assembly 107a, 107b between the rows of cages 104 is effected by displacement of the wheeled platform 111 along rails 108; that the movement of assembly 107a, 107b into and out of a selected cage 104 with which platform 111 is then aligned is effected by displacement of wheeled platform 112 on rail sections 117 relative to platform 111; and that the vertical movements of assembly 107a, 107b are with respect to platform 112.

Figure 6:
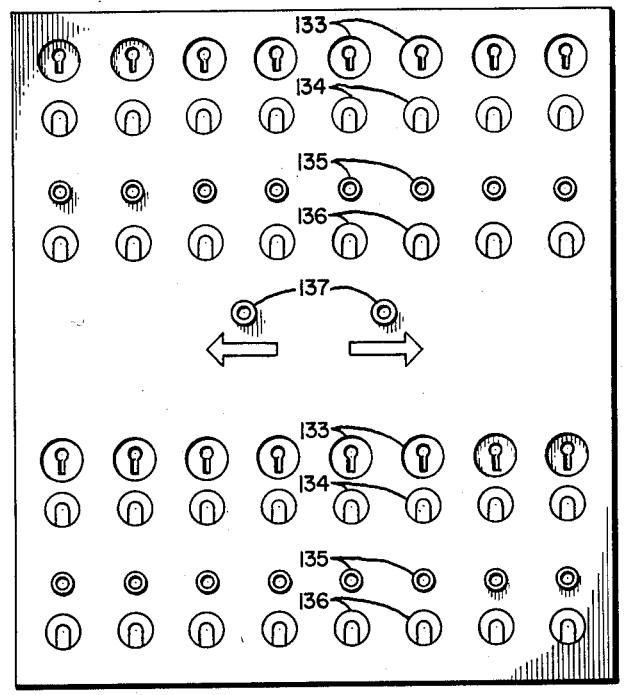
Fig. 6 shows the control panel or table for the automatic garage.

Referring to Fig. 6, it will be seen that a control panel for the automatic garage of Fig. 2 includes an electric key switch 133, a signal lamp 134 and a selecting knob 135 for each of the cages 104. Check back lamps 136 indicate the position of the carriage 107 following a vehicle storing or delivering operation. Knobs 137 on the control panel permit the carriage to be brought from whatever position it occupies (and indicated by one of the lamps 136) to the position which it must occupy as a result of the cage selection. To do this it is sufficient to press one or the other of the knobs 137 according to the required direction of displacement.

For example, the platform 111 may be actuated by a 6 h.p. motor (motor 120) giving it a speed of 2 to 3 m.

per second. As it is necessary to reduce this speed before stopping the platform 111, a suitable device interrupts the feeding of current to the motor 120 and starts the operation of a 1 h.p. motor (motor 123) giving the platform a speed of the order of 0.20 m. per second. At the desired moment a control device which is described below stops the operation of the motor 123 and arrests the movement of the platform 111 by the action of the electric brake 122.

This control device will now be described with reference to Figs. 6, 7 and 8.

When the operator desires to position a vehicle in a selected cage he actuates the related one of the knobs 135 (Fig. 6). This serves to illuminate two lamps 138 and 139 (Fig. 7) arranged at opposite sides of the selected cage.

If the cage is unoccupied and ready to receive the vehicle, the operator is advised of this by the lighting of the related one of the related warning lamps 134 on the panel shown in Fig. 6. At this moment the operator starts the movement of the platform 111 along rails 8 by pressing one of the knobs 137. The knobs 137 act on the feed switches for the motors 120 and 123 (Fig. 8).

The motor 120 drives the platform and the motor 123 turns idly. The electric brake 122 is released and the clutch 126 is at rest.

Figure 7:
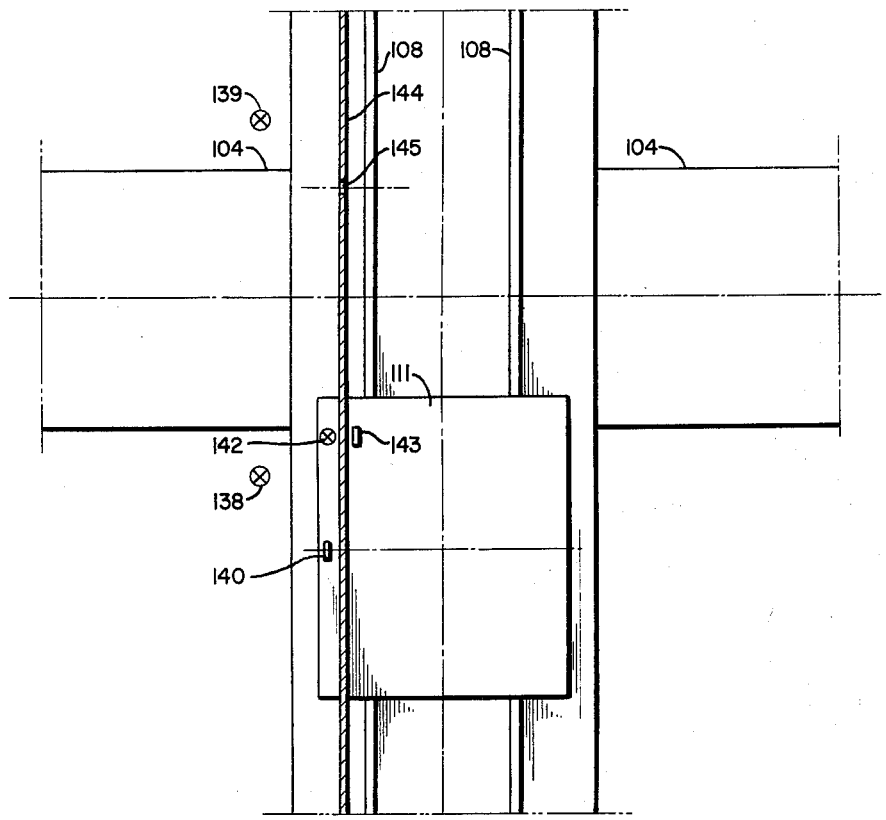
Fig. 7 is a schematic view showing the arrangement of photoelectric cells employed for controlling displacement of the vehicle transporting carriage.

As the platform approaches the cage before which it is to stop, the lamp 138 or the lamp 139, depending upon the direction of arrival of the platform, comes opposite a photoelectric cell 140 carried by the platform 111 as in Figs. 7 and 8. Energization of the cell 140 actuates a relay 141 which includes a self-hold contact $141_1$ and a contact $141_2$ (having a delayed opening). The contact $141_2$ is connected in the circuit of a lamp 142 carried by the platform 111 and arranged to act on a photoelectric cell 143 which is also carried by platform 111. A fixed continuous screen 144 is arranged along the length of the rails 108 and separates lamp 142 from cell 143. This screen 144 includes holes 145 through which the lamp 142 can act on the cell 143 when movement of the platform 111 is to be arrested.

The relay 141 also has a contact $141_3$ which is opened upon energization of relay 141 and which is interposed in the hold circuit of a control relay 120a for the motor 120 so that the latter is deenergized upon energizing of relay 141. Further, relay 141 has a normally open contact $141_4$ in series with the coil of a relay 123a which, when energized, completes the starting circuit for motor 123 and causes engagement of normally disengaged clutch 126.

Accordingly, when cell 140 is energized by lamp 138 or 139 to actuate relay 141, motor 120 is rendered inoperative, and clutch 126 is engaged and motor 123 is operated to drive carriage 107 along rails 108 at a reduced speed, for example, at 0.2 m. per second rather than 3.0 m. per second.

The platform 111 continues to move at such reduced speed until the lamp 142 comes opposite the hole 145 in the fixed screen 144 corresponding to the nearest cage 104 and the cell 143 is then excited and actuates a relay 146 to open the contact $146_1$ thereof for releasing the relay 141 which is then ready for a fresh cycle of operations. Actuation of relay 146 also opens its contact $146_2$ which is interposed in the circuit of the control switch 122a for the brake 122 to cause operation of the brake and consequently to halt the platform 111. Further, relay 146 has a contact $146_3$ which opens on actuation of the relay to disengage the clutch 126 and a contact $146_4$ which also opens to interrupt the circuit of the motor 123. It should be noted that the lamp 142 operating the cell 143 is in series with contact $141_2$ of relay 141 and, hence, is cut off when the relay 141 is released, so that the whole electric control assembly returns to its normal position and is ready to perform a new cycle of operations.

Figure 9:
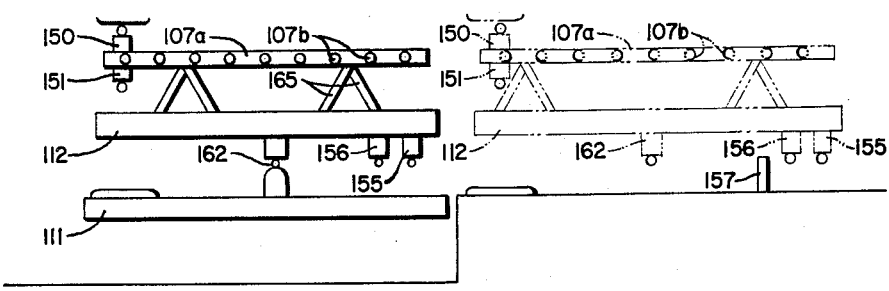
Fig. 9 is a schematic elevational view showing the arrangement of contacts for controlling the movement of the carriage into vehicle receiving cages.
Figure 10:
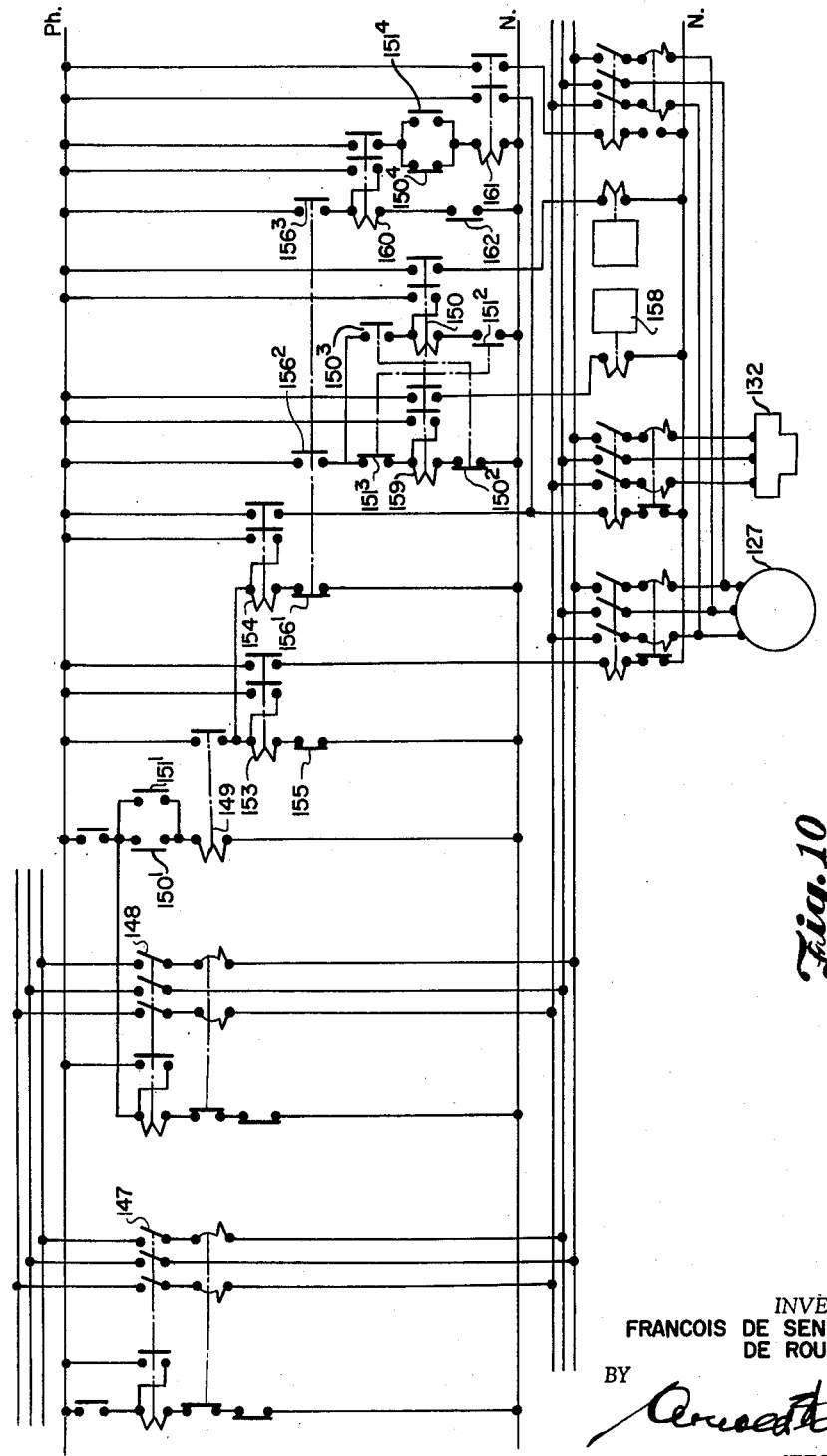
Fig. 10 is a wiring diagram of the electrical controls for the movement of the carriage into vehicle receiving cages.

Figs. 9 and 10 relate to the controls for movement of the platform 112.

The platform 112 can move relative to platform 111 toward one side or the other of the latter for inserting vehicles in, or removing vehicles from, the cages 104 at the opposite sides of the central aisle along which the rails 108 extend.

The entry or exit movement for one side is obtained by inverting two phases of the platform motor 127. It will be apparent that the movement of platform 112 away from platform 111 at one side of the latter corresponds to the movement of platform 112 toward platform 111 at the opposite side of the latter.

Thus, the movements of platform 112 relative to platform 111 at the opposite sides of the latter can be achieved merely by phase inversion.

To obtain this phase inversion it is only necessary to provide photoelectric cells 143 at the opposite sides of the carriage 107 and which are alternatively made operative (according to the cage chosen) by means of two switches 147 or 148 which supply the phases either in the normal order or in the inverse order.

The cells 143 are also used to produce the movements of the platform 112 by action on a relay 149.

Before describing these movements it is necessary to note the following facts:

(1) The carriage 107 which is seeking a vehicle in a cage, has the assembly 107a, 107b in its lower position, and limit controls 150 and 151 responding to vertical movements of such assembly are arranged so that their contacts are as follows: $151_1$ is closed, $150_1$ is open, $151_2$ is open, $150_2$ is closed, $151_3$ is closed, $150_3$ is open, $151_4$ is open, $150_4$ is closed.

(2) On the other hand, when carriage 107 is delivering a vehicle to a cage, the assembly 107a, 107b is raised and the limit controls 150 and 151 are positioned oppositely to that defined above.

If the operation of the whole device is considered it will be seen that, when carriage 107 is searching for a vehicle in a cage one of the photocells 143 has produced the phase selection for the motor 127 for operation either at one side or the other side of platform 111 as selected from the control panel.

The second contact of the operative photo-electric cell 143 produces at the same moment an impulse which is passed to a relay 149 for causing energization of the motor 127 independently of the vertical position of the assembly 107a, 107b and for this reason, the contacts $150_1$ and $151_1$ are connected in parallel. The relay 149 is provided with a contact which is slightly delayed in closing so as to avoid movement of the platform 112 relative to platform 111 before complete stoppage of the platform 111 has occurred. This contact of relay 149, when closed subject to the above mentioned delay, releases since the photo-cell 143 is no longer operated and causes actuation of the relay 153 and the relay 154. The relays 153 and 154 are self-holding and produce the release of the brake 132 and the starting of the motor 127, so that the platform 112 now moves into the selected cage. At a given moment determined by the engagement of the abutment 157 in the cage (Fig. 9) with a limit control 155 on platform 112, motor 127 is stopped by release of the relay 153.

Further coasting of platform 112 into the selected cage 104 brings limit control 156 against abutment 157, and limit control 156 has a contact $156_1$, which opens in response to actuation of the limit control and which is in series with relay 154 to release the latter and thereby apply brake 132. Limit control 156 also has normally open contacts $156_2$ and $156_3$ which are closed by actuation of the limit control and which respectively cause operation of the control 158 for starting the motor 167, by which assembly 107a, 107b is raised, and prepare the circuits for the return of the platform 112 onto the platform 111.

The contact $156_2$, when closed, operates the relay 159 having a hold contact and an operating contact for the control 158 of the lifting movement of the assembly 107a, 107b. When such assembly is in its top position, limit control 150 is engaged and the contact $150_2$ thereof stops the upward movement by breaking the circuit of the relay 159, while the contact $151_3$ of disengaged limit control 151 is opened. Although the contacts $150_3$ and $151_2$ are closed, nothing happens since the contact $156_2$ of limit control 156 only closes during the passage of the limit control 156 over its operating or abutment pin 157.

At the same time that the contact $156_2$ caused energization of the relay 159, the contact $156_3$ operated the relay 160 which locks itself in. The delay contact of this relay is only closed when the limit control 151 is disengaged by upward movement of assembly 107a, 107b, that is the contact $151_4$ and also the contact $150_4$ are open.

When the assembly 107a, 107b arrives at its top position the limit control device 150 becomes operative, the contact $150_4$ is closed. The relay 161 is fed through the delayed contact of the relay 160 and the contact $150_4$. The relay 161 produces the phase inversion for motor 127 and the latter effects the return of the platform 112 on to the platform 111.

The operating cycle is completed when the platform 112 reaches the neutral position where limit control 162 is actuated to break the circuit for relay 160, which, in turn, opens the circuit for relay 161.

The foregoing applies to the delivery of a vehicle, into a cage. On the other hand when a vehicle already in a cage is to be removed, the cycle is different from that described above, in that the received impulses from one of the cells 143 actuates the relay 160 instead of the relay 159 and the operation of the contacts $151_3$, $150_3$, $151_2$, and $150_2$ is the reverse of that previously described.

What I claim is:

1. In a mechanical garage for automotive vehicles having at least one floor with compartments on each floor for the vehicles to be stored arranged in rows at opposite sides of a central lane, a carriage movable along said lane and carrying a platform which is movable laterally with respect to said carriage for entry into said compartments, said platform having a first vertically movable grille of parallel bars adapted to support the wheels of a vehicle during transport of the latter by said carriage, and a second grille of parallel bars in each of said compartments and spaced from the bottom of the latter, said first grille having its bars arranged to pass between said bars of the second grille when said first grille is displaced vertically with said platform in the related compartment so that, in depositing a vehicle in a selected compartment, said first grille can move into the latter at a level above that of said second grille and then move downwardly to cause the wheels of the transported vehicle to be received by said second grille prior to withdrawal of said first grille from said selected compartment and, in removing a vehicle from a selected compartment, said first grille can move into the latter at a level below that of the second grille in said selected compartment and then move upwardly to lift the wheels of the vehicle from said second grille prior to the removal of said first grille, with the wheels of the vehicle resting thereon, from said selected compartment, rails extending along said lane, and wheels on said carriage riding on said rails; the combination of propelling means for effecting the movement of said carriage along said lane including a main, relatively powerful electric motor for driving said carriage along said lane at a relatively high speed to bring said carriage close to a selected compartment, transmission means between the shaft of said main motor and said wheels, an alternately operative auxiliary, relatively weak electric motor for driving said carriage at a relatively slow speed during final movement of the carriage to a position registered with said selected compartment, electric coupling means between the shaft of said auxiliary motor and said shaft of the main motor, electric braking means associated with said shaft of the main motor to arrest the movement of the carriage, first and second photoelectric cells on said carriage, fixed lamps disposed adjacent each of said compartments and adapted, when illuminated to energize said first photoelectric cell, means for illuminating the fixed lamps adjacent a selected compartment to which said carriage is to be moved along said lane so that said first photoelectric cell is energized only when said carriage approaches said selected compartment, a movable lamp on said carriage for energizing said second photoelectric cell, a fixed screen extending along said lane and interposed between said movable lamp and said second photoelectric cell to prevent energization of the latter by said movable lamp, said fixed screen having openings therein selectively registering with said movable lamp and second photoelectric cell only when said carriage is aligned with a compartment corresponding to the selectively registered opening, means for energizing said main motor to drive said carriage at relatively high speed in the direction toward said selected compartment, means responsive to energization of said first phootelectric cell by one of said fixed lamps adjacent said selected compartment to de-energize said main motor, energize said auxiliary motor and engage said electric coupling means, so that said auxiliary motor then drives said carriage at relatively slow speed, and to illuminate said movable lamp, and means responsive to energization of said second photoelectric cell by said movable lamp, upon registration of the latter with an opening in said screen corresponding to said selected compartment, to de-energize said auxiliary motor and coupling means and to energize said braking means.

2. In a mechanical garage for automotive vehicles, the combination as in claim 1, further comprising reversible motor means moving said platform laterally with respect to said carriage in opposed directions for effecting entry and removal of said platform with respect to the compartments at one side of said lane and for effecting removal and entry of said platform with respect to the compartments at the opposite side of said lane, respectively, and means responsive to energization of said second photoelectric cell to energize said reversible motor for effecting movement of said platform into the selected compartment.

References Cited in the file of this patent

UNITED STATES PATENTS

| | | |
|---|---|---|
| 1,382,328 | Stone | June 21, 1921 |
| 1,598,507 | Robbins | Aug. 31, 1926 |
| 1,883,964 | Kramer | Oct. 25, 1932 |
| 1,911,015 | Crabbe | May 23, 1933 |
| 2,014,351 | Becker | Sept. 10, 1935 |
| 2,028,476 | Rome et al. | Jan. 21, 1936 |
| 2,120,751 | Jenney | June 14, 1938 |
| 2,598,413 | Morley | May 27, 1952 |
| 2,598,750 | Bargehr | June 3, 1952 |

FOREIGN PATENTS

| | | |
|---|---|---|
| 281,626 | Switzerland | July 1, 1952 |